(12) United States Patent
Hsieh

(10) Patent No.: US 10,807,175 B1
(45) Date of Patent: Oct. 20, 2020

(54) PNEUMATIC RECIPROCATING SAW

(71) Applicant: DIN LONG INDUSTRIAL CO., LTD., Taoyuan (TW)

(72) Inventor: Jung-Fu Hsieh, Taoyuan (TW)

(73) Assignee: DIN LONG INDUSTRIAL CO., LTD., Taoyuan (TW)

( * ) Notice: Subject to any disclaimer, the term of this patent is extended or adjusted under 35 U.S.C. 154(b) by 0 days.

(21) Appl. No.: 16/594,542

(22) Filed: Oct. 7, 2019

(51) Int. Cl.
*B23D 49/00* (2006.01)
*B23D 49/16* (2006.01)
*B23D 51/18* (2006.01)

(52) U.S. Cl.
CPC .......... *B23D 49/00* (2013.01); *B23D 49/162* (2013.01); *B23D 51/18* (2013.01)

(58) Field of Classification Search
CPC ........ B23D 51/18; B23D 51/00; B23D 51/08; B23D 51/10; B23D 51/16; B23D 49/162; B23D 49/00; B23D 49/02; B23D 49/06; B23D 49/10; B23D 49/105; B23D 49/12; B23D 49/14; B23D 49/165; B23D 49/167; B23D 49/08; B23D 49/16
USPC .................................................... 30/392–394
See application file for complete search history.

(56) References Cited

U.S. PATENT DOCUMENTS

| 3,750,483 | A | * | 8/1973 | Burrows | ................ | B23D 51/16 74/50 |
| 4,884,344 | A | * | 12/1989 | Martinez | ............. | B23D 49/165 30/394 |
| 8,646,185 | B2 | | 2/2014 | Liaw | | |
| 2010/0180455 | A1 | * | 7/2010 | Haas | ..................... | B23D 49/162 30/392 |
| 2011/0247847 | A1 | * | 10/2011 | Holmes | ................... | B27B 19/09 173/19 |
| 2012/0192438 | A1 | * | 8/2012 | Aoki | ...................... | B23D 51/16 30/392 |
| 2019/0351539 | A1 | * | 11/2019 | Onishi | ..................... | B25F 5/00 |

FOREIGN PATENT DOCUMENTS

CN 208067467 U 11/2018

* cited by examiner

*Primary Examiner* — Phong H Nguyen
(74) *Attorney, Agent, or Firm* — Muncy, Geissler, Olds & Lowe, PC

(57) ABSTRACT

A pneumatic reciprocating saw comprises a housing, a saw extending into the housing, a pneumatic motor assembled with the housing and a transmission assembly. The pneumatic motor comprises an output shaft, the transmission assembly comprises a driving bevel gear arranged on the output shaft, a transmission bevel gear engaged with the driving bevel gear, a driven rod being arranged on the transmission bevel gear, a pushing block being eccentrically arranged on the driven rod, a transmission rod assembled with the saw, and a thermal insulator sleeved on the transmission rod without being shifting along with the transmission rod. The transmission rod comprises a groove for placing the pushing block to slide therein, when the transmission rod is driven to reciprocate in a linear track, a tail end of the transmission rod not connected with the saw being limited by the thermal insulator to only move in the linear track.

14 Claims, 8 Drawing Sheets

PNEUMATIC RECIPROCATING SAW

FIELD OF THE INVENTION

The invention relates to a pneumatic reciprocating saw, in particular to a pneumatic reciprocating saw with a heat insulation effect.

BACKGROUND OF THE INVENTION

The existing pneumatic reciprocating saw mainly utilizes a high pressured air as a power source to drive a pneumatic motor to drive a transmission assembly, so that a blade of the existing pneumatic reciprocating saw can perform reciprocating shift to cut objects to be cut. Further, for the structure of the conventional pneumatic reciprocating saw can be refer to the patent of U.S. Pat. No. 8,646,185.

U.S. Pat. No. 8,646,185 discloses a pneumatic reciprocating saw comprising a driving machine, a machine body and a cutter. The driving machine have a driving shaft and a trigger, the driving shaft is rotatably arranged in the driving machine with one end protruding outside the driving machine and a gear part is arranged at an end of the driving shaft, the driving shaft is interconnected with and controlled by the trigger. The machine body comprises a housing, a driving gear, a driving piece and a driven piece, wherein the housing is a hollow block and is provided with at least two openings, wherein one opening is connected with one end of the driving machine, the driving gear is rotatably arranged in the housing, the driving gear is provided with a tooth groove part, and the tooth groove part is engaged with a gear part of the driving shaft of the driving machine. The driving gear is connected with a convex column, the convex column is located at an off-axis position of one end face of the driving gear, the driving piece is a block, an elongated driving groove is radially arranged on the block, the driving groove of the driving piece is slidably combined with the convex column of the driving gear, and the driven piece is a rod. The driven piece is slidably arranged through the housing and forms a connecting part at one end, and the driven piece is mutually connected with the driving piece through the connecting part. One end of the cutter is connected with one end of the driven piece far away from the connecting part, and the other end of the cutter protrudes out of the other opening of the housing. However, many parts are required for this patent, so that rapid assembly is not facilitated, and more attention needs to be paid to the assembly relationship between components during assembly, so that the pneumatic reciprocating saw is complicated and time-consuming to assemble.

Accordingly, the applicant of the present application has filed a patent of CN 208067467U for solving the afore mentioned problems. The applicant has found that when the pneumatic reciprocating saw disclosed as mentioned above is implemented, because the transmission assembly thereof operates for a long time, each element of the transmission assemblies generates heat energy due to friction therebetween, and the heat is also conducted to the housing of the pneumatic reciprocating saw at the same time, so that the housing of the pneumatic reciprocating saw is heat up, and a user cannot hold the pneumatic reciprocating saw for a long time. In addition, since the driven piece of the conventional pneumatic reciprocating saw is only provided with a single supporting point after being assembled, the driven piece is easy to deviate during implementation, and the pneumatic reciprocating saw cannot perform good cutting operation.

SUMMARY OF THE INVENTION

The invention mainly aims to solve the problem that a user cannot hold the housing of a conventional pneumatic reciprocating saw due to overheating.

The secondary purpose of the invention is to solve the problem that a conventional driven piece only has a single supporting point and is easy to deviate during implementation.

To achieve the above objects, the present invention provides a pneumatic reciprocating saw, comprising a housing, a pneumatic motor, a saw, and a transmission assembly. The housing is formed with a first assembly space, a second assembly space orthogonal to the first assembly space, a first assembly hole communicating with the first assembly space and a saw assembly opening communicating with the second assembly space. The pneumatic motor is assembled with the housing through the first assembly hole and is provided with an output shaft. The saw extends into the second assembly space through the saw assembly opening. The transmission assembly is provided with a driving bevel gear arranged on the output shaft and extending into the first assembly space, a transmission bevel gear being arranged in the first assembly space and engaged with the driving bevel gear, a driven rod being arranged on the transmission bevel gear, a pushing block being arranged on the driven rod and positioned in the second assembly space and being eccentrically arranged from an axis of the driven rod, a transmission rod being arranged in the second assembly space and assembled with the saw, and a thermal insulator being sleeved on a tail end of the transmission rod which is not connected with the saw and contacting the housing without being shifting along with the transmission rod. The transmission rod is provided with a groove for placing the pushing block. When the transmission rod is driven to reciprocate in a linear track, the tail end of the transmission rod which is not connected with the saw is limited by the thermal insulator and is able to only move in the linear track. The pushing block slides in the groove.

In one embodiment, the thermal insulator comprises a first supporting part sleeved on the transmission rod and in contact with the housing, a connecting part integrally extending from the first supporting part, a second supporting part integrally extending from the connecting part and sleeved on the transmission rod and in contact with the housing, and a hollowed-out part arranged corresponding to the connecting part to provide the pushing block to shift therein.

In one embodiment, the saw comprises an operative side for performing a cutting operation and an inoperative side opposite to the operative side, and the housing has an avoidance groove facing the operative side.

In one embodiment, the thermal insulator is made of a Bakelite material.

In one embodiment, the pushing block comprises a displacement range during sliding, and a length of the hollowed-out part is larger than the displacement range of the pushing block to let the pushing block to shift therein.

In one embodiment, the transmission rod comprises a first extension direction, the groove has a second extension direction perpendicular to the first extension direction, and the groove penetrates through the transmission rod.

In one embodiment, the transmission rod has a rod diameter, the pushing block has a pushing block length in the second extension direction, and the pushing block length is greater than the rod diameter.

In one embodiment, the driven rod is provided with a first rod section connected with the transmission bevel gear and a second rod section eccentrically arranged from a center of the first rod section and assembled with the pushing block.

In one embodiment, the transmission bevel gear has a working surface annularly arranged with a gear and a bottom surface opposite to the working surface, and the driven rod is arranged on the working surface of the transmission bevel gear.

In one embodiment, the housing comprises a second assembly hole communicating with the first assembly space to allow the transmission bevel gear to be placed into the first assembly space, and a cover disposed corresponding to the second assembly hole to close the second assembly hole and facing the bottom surface.

On the basis of the above disclosure, the present invention has the following characteristics compared with the conventional use: in the present invention, the transmission assembly has the thermal insulator, and the thermal insulator is sleeved on the transmission rod and contacts the housing. When the transmission rod is shifting under the action of the pushing block, because the thermal insulator sleeves on the transmission rod, the thermal insulator can insulate the heat energy transmitted by the transmission rod and other components. Thereby, the housing is prevented from overheating due to the fact that the heat energy is transmitted to the housing. Furthermore, after the transmission rod is assembled, in addition to an existing support point, the present invention further provides a support for the transmission rod by the thermal insulator, so that the transmission rod can drive the saw blade to move more stably during implementation.

DETAILED DESCRIPTION OF THE PREFERRED EMBODIMENTS

Figure 1:
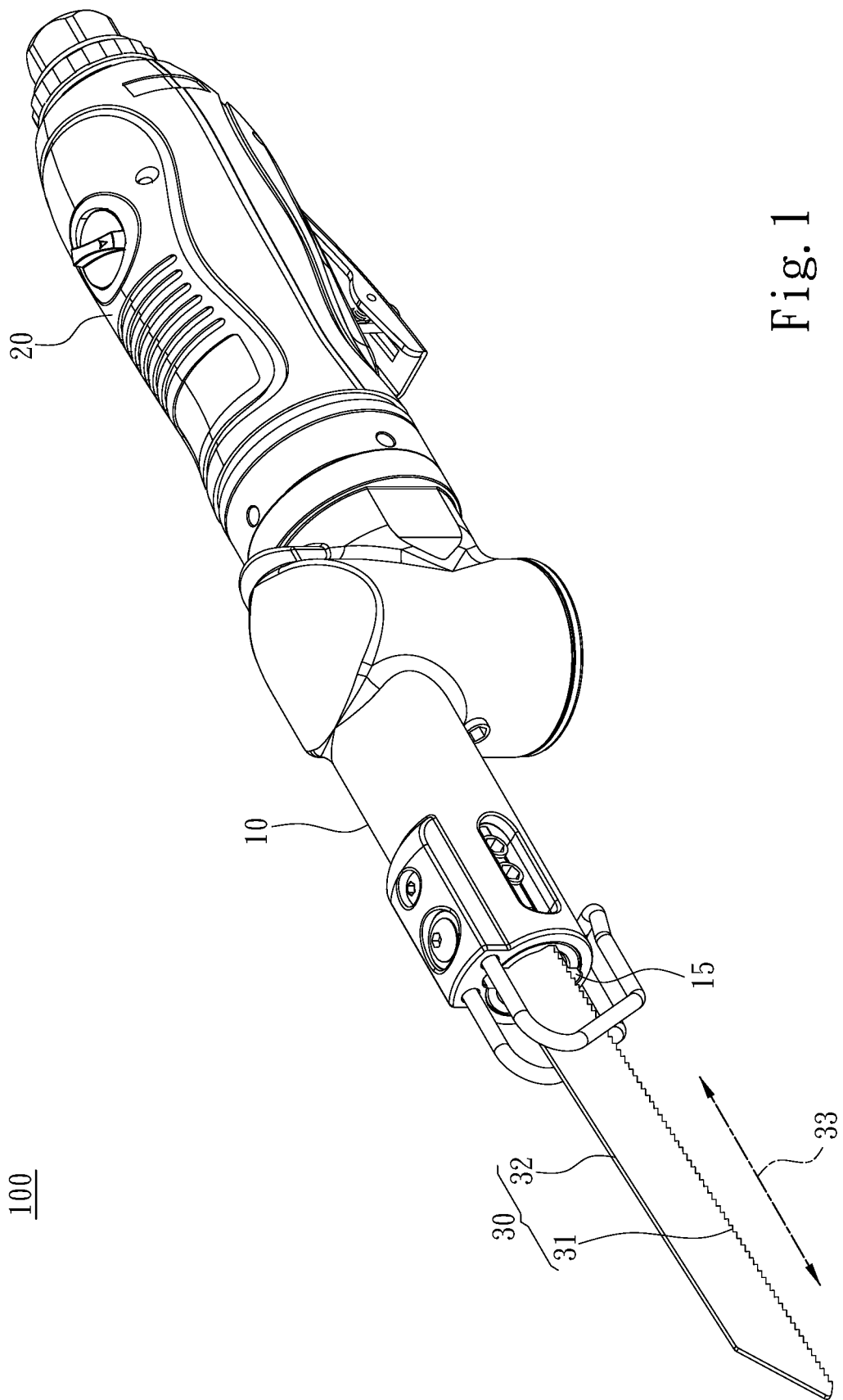
FIG. 1 is a structural schematic perspective view of an embodiment of the present invention.

The detailed description and technical contents of the present invention will now be described with reference to the drawings as follows:

Hereinafter, the terms "first" and "second" used with respect to elements are intended to distinguish the elements and are not intended to limit the order of the elements. Further, as used herein, spatial relative terms such as "top", "bottom", "up", "down" and the like are based on the orientation depicted in the figures herein, and it is to be understood that the spatial relative terms may vary with the change of the orientation depicted in the figures. For example, after FIG. 1 is disposed transversely, the previous "top" and "bottom" will vary to "left" and "right", respectively.

Referring to FIGS. 1, 2, 3, 4A and 4B, the present invention provides a pneumatic reciprocating saw 100 comprising a housing 10, a pneumatic motor 20, a saw 30, and a transmission assembly 40. The housing 10 is formed with a first assembly space 11, a second assembly space 12 orthogonal to the first assembly space 11, a first assembly hole 13 communicating with the first assembly space 11, and a saw assembly opening 14 communicating with the second assembly space 12, the first assembly space 11 and the second assembly space 12 being respectively located on two sides of the housing 10. For example, when the second assembly space 12 is located at the left side of the housing 10 and disposed in a horizontal direction, the first assembly space 11 being located at the right side of the housing 10 and disposed in a vertical direction, and the first assembly space 11 and the second assembly space 12 communicating with each other. Further, the first assembly hole 13 is provided at a side of the first assembly space 11 which is not connected with the second assembly space 12, and the saw assembly opening 14 is provided at a side of the second assembly space 12 which does not face the first assembly space 11. In other words, the first assembly hole 13 and the saw assembly opening 14 are respectively located on two sides of the housing 10, and the first assembly hole 13, the saw assembly opening 14, the first assembly space 11 and the second assembly space 12 communicate with each other, that is, the housing 10 has a hollow structure.

Furthermore, the pneumatic motor 20 is assembled with the housing 10 through the first assembly hole 13, and the pneumatic motor 20 has an impeller set (not shown in figures) for receiving high-pressure gas to rotate and an output shaft 21 connected to the impeller set, and the impeller set rotates to drive the output shaft 21 to make the output shaft 21 perform circular motion. In addition, the saw 30 extends into the housing 10 through the saw assembly opening 14, and after assembly is completed, only a part of the saw 30 extends into the second assembly space 12, while the rest of the saw 30 is exposed to the outside.

On the other hand, the transmission assembly 40 is provided with a driving bevel gear 41 arranged on the output shaft 21 and extending into the first assembly space 11, a transmission bevel gear 42 arranged in the first assembly space 11 and engaged with the driving bevel gear 41, a driven rod 43 arranged on the transmission bevel gear 42, a pushing block 44 which is arranged on the driven rod 43 and is positioned in the second assembly space 12 and deviates from an axis of the driven rod 43, a transmission rod 45 which is arranged in the second assembly space 12 and is assembled with the saw 30, and a thermal insulator 46 which is sleeved on the transmission rod 45 and contacts the housing 10 without being shifting along with the transmission rod 45. In one embodiment, the driving bevel gear 41 of the present invention may be one-piece formed with the output shaft 21. Further, the driving bevel gear 41 and the transmission bevel gear 42 are perpendicular to each other, for example, when a setting direction of the driving bevel gear 41 is vertical, the transmission bevel gear 42 is set to be horizontal. In addition, the driven rod 43 comprises a first rod section 431 connected to the transmission bevel gear 42 and a second rod section 432 eccentrically arranged from a center of the first rod section 431 and assembled with the pushing block 44. Further, a diameter of the first rod section 431 is larger than a diameter of the second rod section 432, and the first rod section 431 and the second rod section 432 may be two sections of a same rod or may be a plurality of members to be combined into the rod. Further, the transmission rod 45 has a first extension direction 451, and after the saw 30 is assembled with the transmission rod 45, the saw 30 is also disposed along the first extension direction 451. Further, the transmission rod 45 comprises a groove 452 for placing the pushing block 44. In one embodiment, the groove 452 has a second extension direction 453, the second extension direction 453 is perpendicular to the first extension direction 451, and the groove 452 penetrates through the transmission rod 45. Further, the transmission rod 45 has a rod diameter 454, the pushing block 44 has a pushing block length 441 in the second extension direction 453, and the pushing block length 441 is greater than the rod diameter 454. That is, when the pushing block 44 is placed into the groove 452, the pushing block 44 will protrude out of at least one side of the transmission rod 45. The thermal insulator 46 covers a portion of the transmission rod 45, and an inner diameter of the thermal insulator 46 is set corresponding to an outer diameter of the transmission rod 45. When the thermal insulator 46 is provided in the second assembly space 12 of the housing 10, the thermal insulator 46 can limit one end of the transmission rod 45 which is not connected to the saw 30 at a position inside the housing 10. This prevents deviation of the transmission rod 45 during actuation. Compared with the prior art, in addition to a conventional supporting part 50, the transmission rod 45 receives additional support from the thermal insulator 46 through the arrangement of the thermal insulator 46, so that the transmission rod 45 can drive the saw 30 more stably in implementation. Also, in order to provide a heat blocking effect, the material of the thermal insulator 46 may be any material that blocks heat transfer depending on the implementation.

Referring to FIGS. 2, 6, 7 and 8, the implementation of the pneumatic reciprocating saw 100 will be described. Once the pneumatic motor 20 is started, the output shaft 21 rotates and drives the driving bevel gear 41, and then the driving bevel gear 41 acts on the transmission bevel gear 42 and let the transmission bevel gear 42 to rotate. In addition, due to the fact that the pushing block 44 is placed in the groove 452 in the present invention, when the transmission bevel gear 42 drives the driven rod 43, the pushing block 44 slides in the groove 452 under the action of the driven rod 43. When the pushing block 44 slides, the transmission rod 45 is pushed by the pushing block 44 to reciprocate and shift in a linear track 455, so that the saw 30 is driven by the transmission rod 45 to enable the saw 30 to perform a reciprocating shift stroke 33 for cutting operation. In addition, since the thermal insulator 46 is sleeved on the transmission rod 45, one end of the transmission rod 45 which is not connected with the saw 30 is limited by the thermal insulator 46 and can only travel in the linear track 455, and when the transmission rod 45 receives heat thermally conducted by other elements of the transmission assembly 40, the thermal insulator 46 can effectively insulate heat from being transmitted to the housing 10 of the pneumatic reciprocating saw 100. Thereby, a user can hold on the housing 10 when operating the pneumatic reciprocating saw 100, and the situation that the housing 10 cannot be held due to overheating does not occur.

Referring again to FIG. 2 and FIG. 3, in one embodiment, in order for the thermal insulator 46 to assist the transmission rod 45 for a more stable reciprocating motion, the thermal insulator 46 includes a first supporting part 461 sleeved on the transmission rod 45 and in contact with the housing 10, a connecting part 462 that extends integrally from the first supporting part 461, a second supporting part 463 integrally extending from the connecting part 462 and sleeved on the transmission rod 45 and in contact with the housing 10, and a hollowed-out part 464 arranged corresponding to the connecting part 462 to provide the pushing block 44 to be disposed therein. The first supporting part 461 and the second supporting part 463 are respectively annularly sleeved on the transmission rod 45, and the first supporting part 461, the connecting part 462 and the second supporting part 463 can be integrally formed. In addition, the pushing block 44 has a displacement range when sliding, a length 465 of the hollowed-out part 464 is larger than the displacement range of the pushing block 44, and when the pneumatic reciprocating saw 100 is implemented, the pushing block 44 moves in the hollowed-out part 464 after being acted on, more specifically, the pushing block 44 will contact the first supporting part 461 or the second supporting part 463, respectively. When the pushing block 44 contacts the first supporting part 461, the pushing block 44 drives the transmission rod 45 to move forward so that the saw 30 protrudes away from the saw assembly opening 14. Further, when the pushing block 44 contacts the second supporting part 463, the pushing block 44 drives the transmission rod 45 to return, and at this time, the saw 30 is retracted into the second assembly space 12. Thus, as the pushing block 44 is continuously moving in a reciprocating manner within the hollowed-out part 464, the saw 30 can perform cutting in a reciprocating manner. In this way, the thermal insulator 46 of the present invention specifically supports the transmission rod 45 with the first supporting part 461 and the second supporting part 463, respectively, that is, besides a support from the conventional supporting part 50, the transmission rod 45 can receive additional support through the arrangement of the thermal insulator 46, allowing the transmission rod 45 to reciprocate more stably in the linear track 455. Further, in addition to the afore mentioned auxiliary support of the transmission rod 45, the thermal insulator 46 is made of an Bakelite material in this embodiment in order to provide a good heat resistance for the pneumatic reciprocating saw 100.

Figure 5:
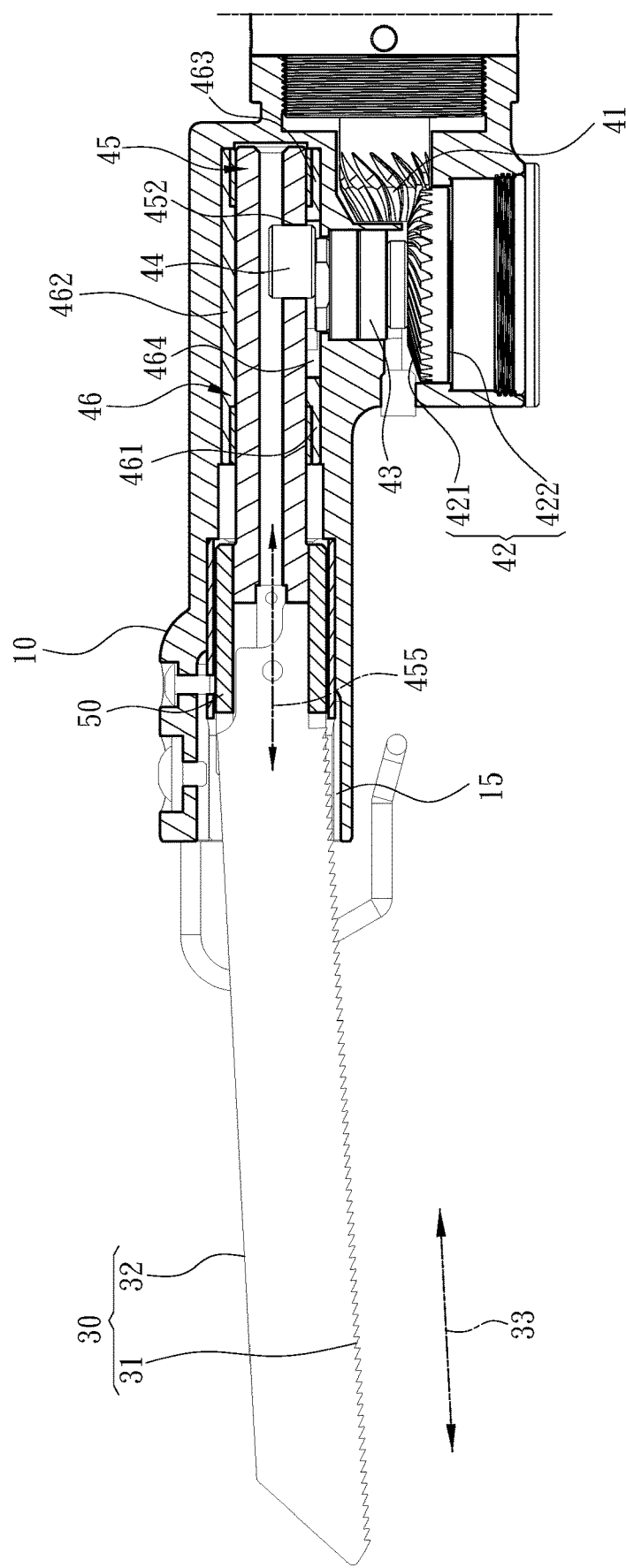
FIG. 5 is a structural schematic cross-sectional view of an embodiment of the present invention.
Figure 6:
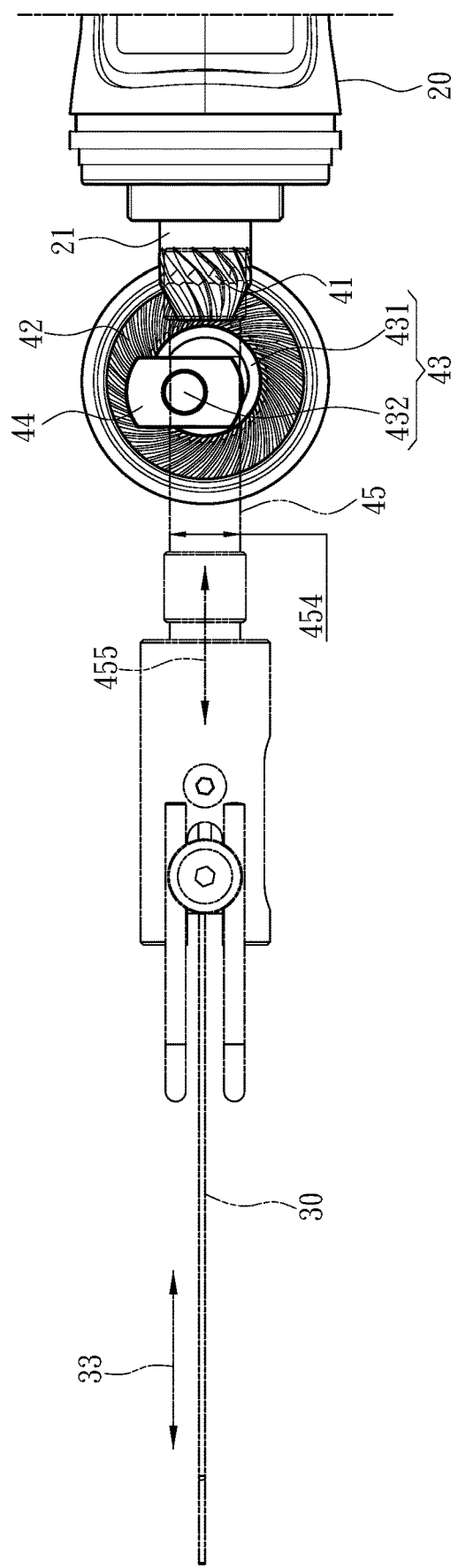
FIG. 6 is a schematic view (I) of the implementation of an embodiment of the present invention.
Figure 7:
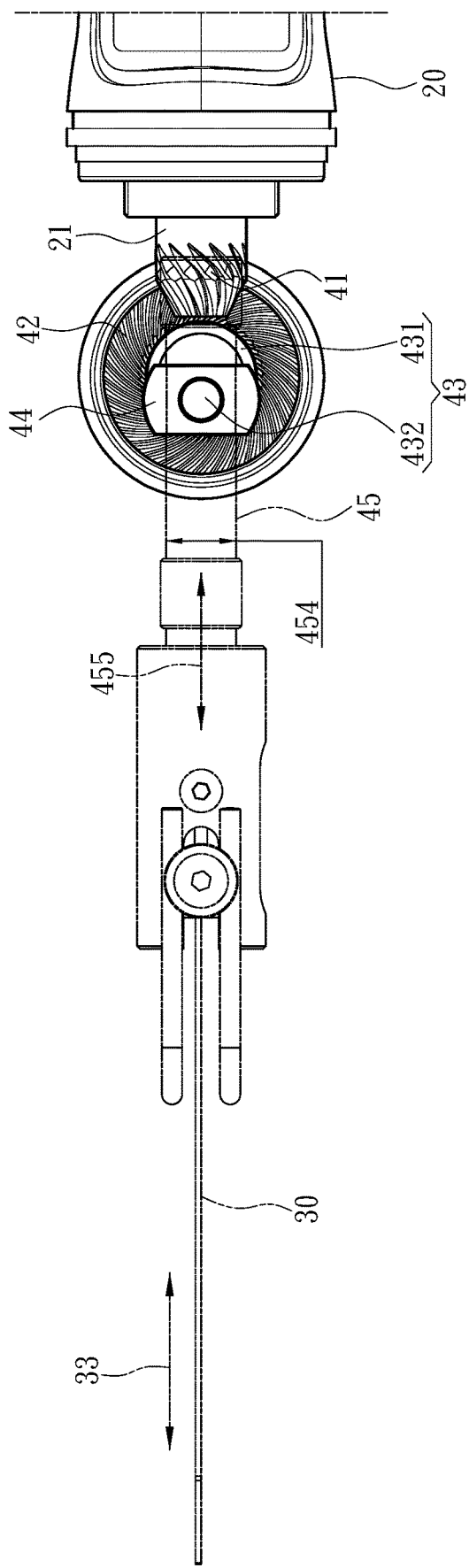
FIG. 7 is a schematic view (II) of the implementation of an embodiment of the present invention.
Figure 8:
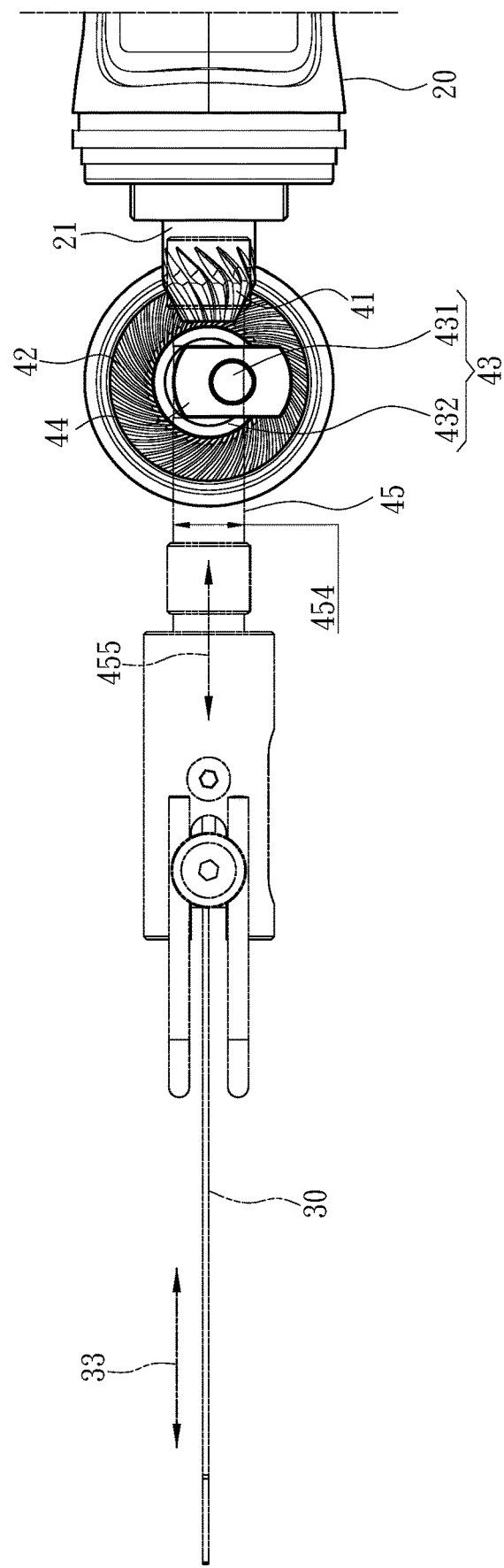
FIG. 8 is a schematic view (III) of the implementation of an embodiment of the present invention.

In addition, referring again to FIG. 2 and FIG. 5, in one embodiment, the housing 10 of the present invention is provided with an avoidance groove 15 for the pneumatic reciprocating saw 100 of the present invention to be used with replacement of a different saw 30. Specifically, the saw 30 has an operative side 31 for performing a cutting operation and an inoperative side 32 opposite the operative side 31. The operative side 31 described herein may be the blade portion of the saw 30 and the inoperative side 32 being the back portion of the saw 30. Further, the avoidance groove 15 of the housing 10 is provided facing the blade portion of the saw 30, whereby when the saw 30 performs a reciprocating cutting action, the blade portion of the saw 30 is prevented from contacting the housing 10 when the saw 30 is retracted into the second assembly space 12, thereby allowing blades of different sizes to be replaced for the pneumatic reciprocating saw 100 without worry that the replaced saw 30 is not applicable.

Figure 2:
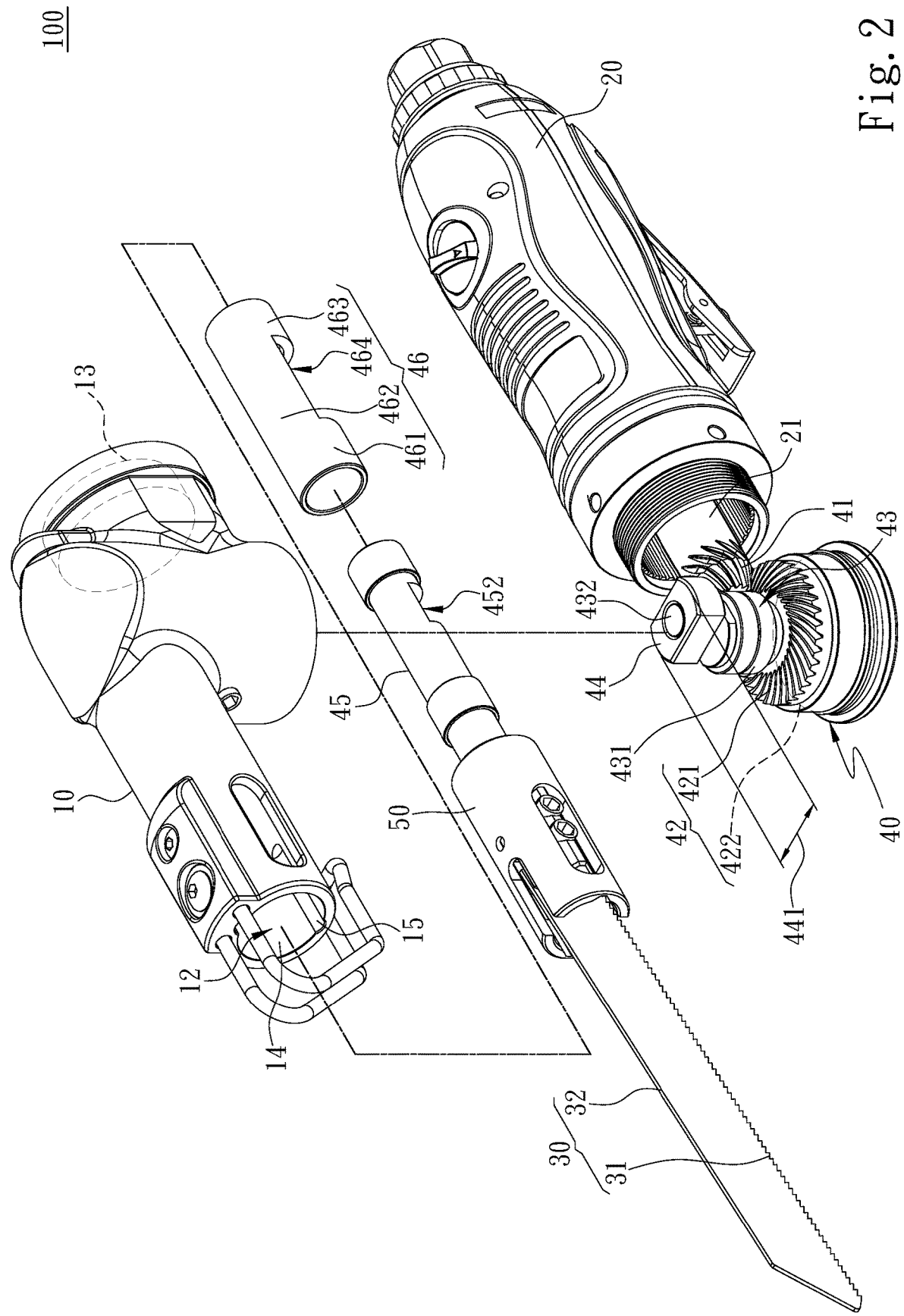
FIG. 2 is a structural schematic exploded view of an embodiment of the present invention.
Figure 3:
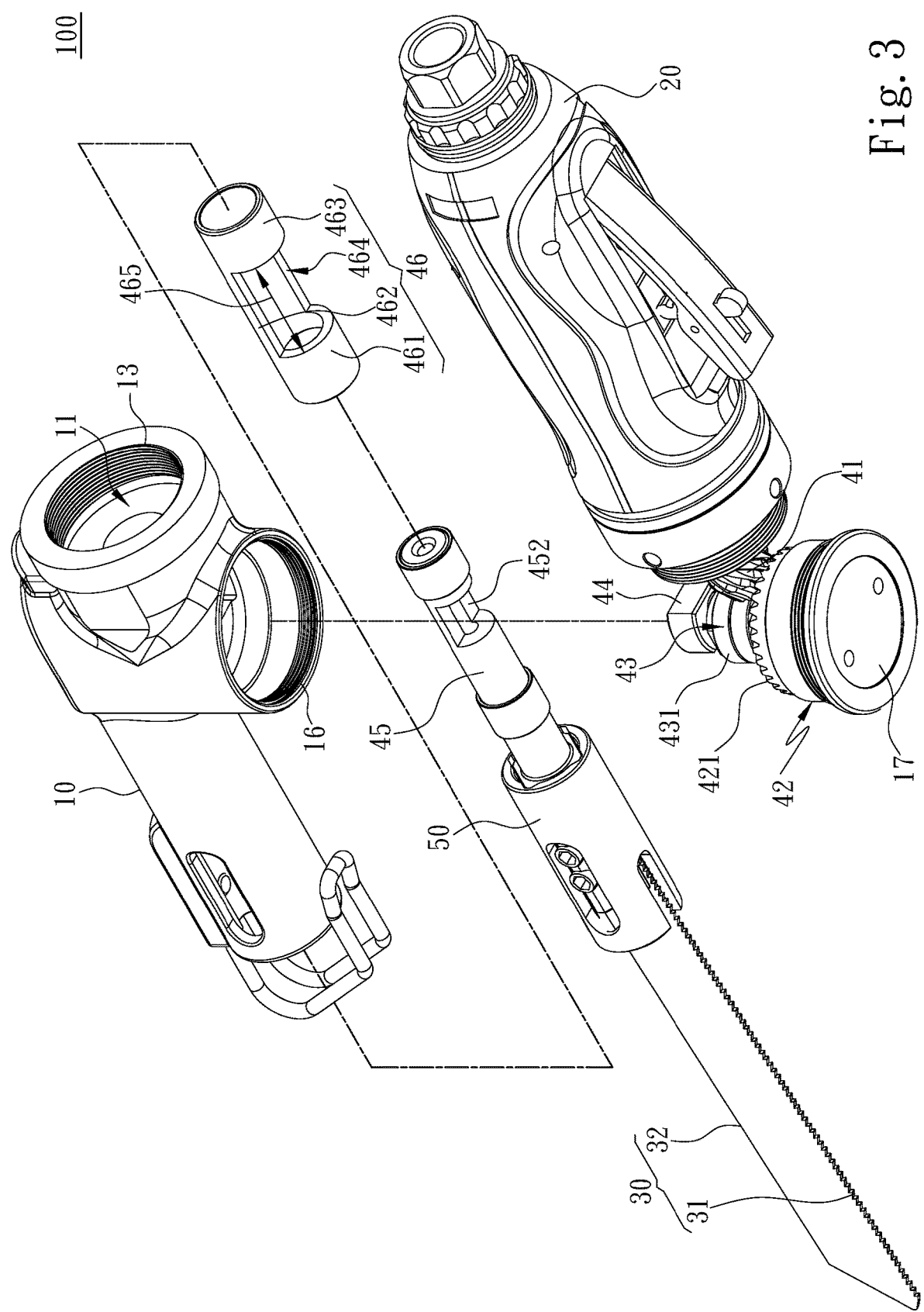
FIG. 3 is a structural schematic exploded view from another direction of an embodiment of the present invention.
Figure 4A:
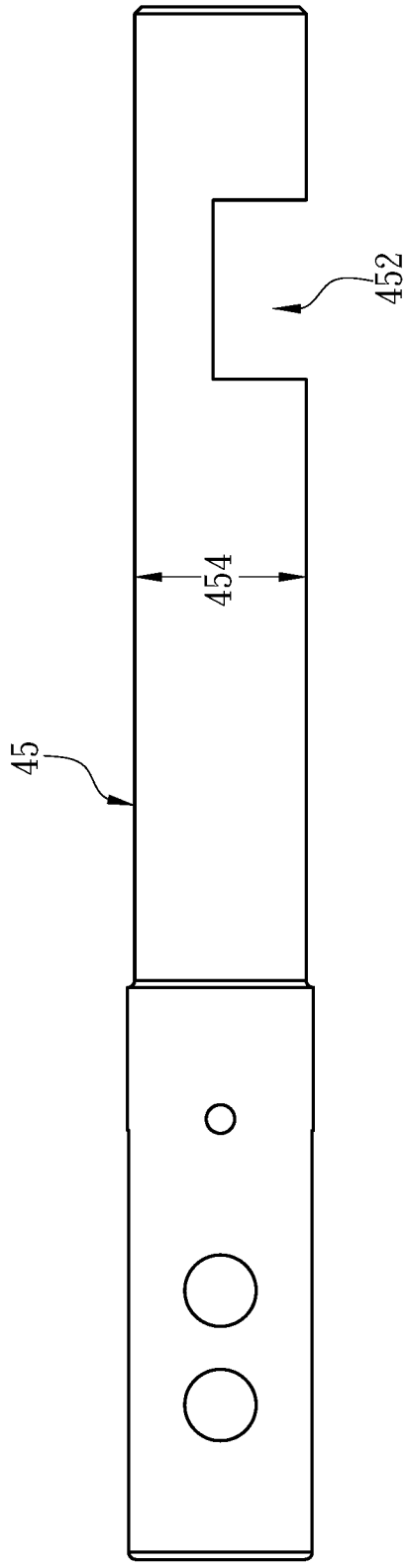
FIG. 4A is a schematic side view of a transmission rod of an embodiment of the present invention.
Figure 4B:
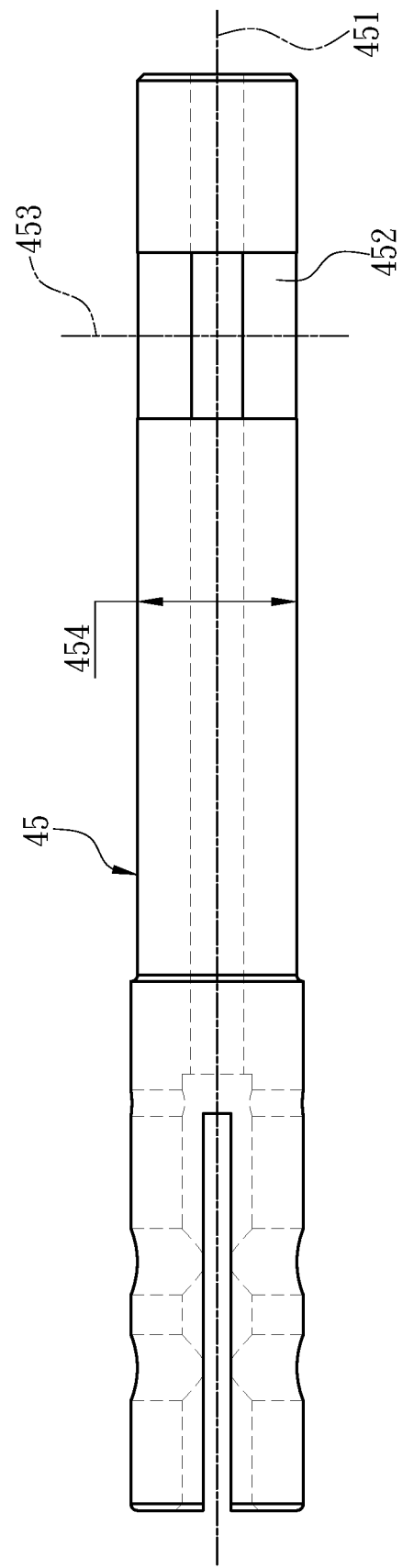
FIG. 4B is a schematic bottom view of a transmission rod of an embodiment of the present invention.

On the other hand, referring to FIG. 2 and FIG. 3, the transmission bevel gear 42 comprises a working surface 421 annularly arranged with gear tooth and a bottom surface 422 opposite to the working surface 421, and the driven rod 43 is provided on the working surface 421 of the transmission bevel gear 42. The housing 10 comprises a second assembly hole 16 communicating with the first assembly space 11 to allow the transmission bevel gear 42 to be placed into the first assembly space 11, and a cover 17 provided corresponding to the second assembly hole 16. After the transmission bevel gear 42 is placed in the first assembly space 11, the cover 17 is disposed facing the bottom surface 422 of the transmission bevel gear 42, and the cover 17 is assembled on the second assembly hole 16, whereby the cover 17 closes the second assembly hole 16 and restricts the transmission bevel gear 42 in the housing 10.

What is claimed is:

1. A pneumatic reciprocating saw, comprising:
a housing, formed with a first assembly space, a second assembly space orthogonal to the first assembly space, a first assembly hole communicating with the first assembly space and a saw assembly opening communicating with the second assembly space;
a pneumatic motor, assembled with the housing through the first assembly hole, the pneumatic motor being provided with an output shaft;
a saw, extending into the second assembly space through the saw assembly opening; and
a transmission assembly, the transmission assembly being provided with a driving bevel gear arranged on the output shaft and extending into the first assembly space, a transmission bevel gear being arranged in the first assembly space and engaged with the driving bevel gear, a driven rod being arranged on the transmission bevel gear, a pushing block being arranged on the driven rod and positioned in the second assembly space and being eccentrically arranged from an axis of the driven rod, a transmission rod being arranged in the second assembly space and assembled with the saw, and a thermal insulator being sleeved on a tail end of the transmission rod which is not connected with the saw and contacting the housing without being shifting along with the transmission rod, the transmission rod being provided with a groove for placing the pushing block, when the transmission rod is driven to reciprocate in a linear track, the tail end of the transmission rod which is not connected with the saw being limited by the thermal insulator and being able to only move in the linear track, and the pushing block sliding in the groove.

2. The pneumatic reciprocating saw according to claim 1, wherein the thermal insulator comprises a first supporting part sleeved on the transmission rod and in contact with the housing, a connecting part integrally extending from the first supporting part, a second supporting part integrally extending from the connecting part and sleeved on the transmission rod and in contact with the housing, and a hollowed-out part arranged corresponding to the connecting part to provide the pushing block to shift therein.

3. The pneumatic reciprocating saw according to claim 2, wherein the saw comprises an operative side for performing a cutting operation and an inoperative side opposite to the operative side, and the housing has an avoidance groove facing the operative side.

4. The pneumatic reciprocating saw according to claim 2, wherein the thermal insulator is made of a Bakelite material.

5. The pneumatic reciprocating saw according to claim 2, wherein the pushing block comprises a displacement range during sliding, and a length of the hollowed-out part is larger than the displacement range of the pushing block to let the pushing block to shift therein.

6. The pneumatic reciprocating saw according to claim 5, wherein the saw comprises an operative side for performing a cutting operation and an inoperative side opposite to the operative side, and the housing has an avoidance groove facing the operative side.

7. The pneumatic reciprocating saw according to claim 6, wherein the transmission rod has a first extension direction, the groove has a second extension direction perpendicular to the first extension direction, and the groove penetrates through the transmission rod.

8. The pneumatic reciprocating saw according to claim 7, wherein the transmission rod has a rod diameter, the pushing block has a pushing block length in the second extension direction, and the pushing block length is greater than the rod diameter.

9. The pneumatic reciprocating saw according to claim 8, wherein the driven rod is provided with a first rod section connected with the transmission bevel gear and a second rod section eccentrically arranged from a center of the first rod section and assembled with the pushing block.

10. The pneumatic reciprocating saw according to claim 9, wherein the transmission bevel gear has a working surface annularly arranged with gear tooth and a bottom surface opposite to the working surface, and the driven rod is arranged on the working surface of the transmission bevel gear.

11. The pneumatic reciprocating saw according to claim 10, wherein the housing has a second assembly hole communicating with the first assembly space to allow the transmission bevel gear to be placed into the first assembly space, and a cover disposed corresponding to the second assembly hole to close the second assembly hole and facing the bottom surface.

12. The pneumatic reciprocating saw according to claim 1, wherein the thermal insulator is made of a Bakelite material.

13. The pneumatic reciprocating saw according to claim 12, wherein the saw comprises an operative side for performing a cutting operation and an inoperative side opposite to the operative side, and the housing has an avoidance groove facing the operative side.

14. The pneumatic reciprocating saw according to claim 1, wherein the saw comprises an operative side for performing a cutting operation and an inoperative side opposite to the operative side, and the housing has an avoidance groove facing the operative side.

* * * * *